United States Patent [19]

Compton

[11] Patent Number: 5,385,006
[45] Date of Patent: Jan. 31, 1995

[54] SLIP MEMBER FOR THE HEAD OF A TREE SHAKING HARVESTER

[76] Inventor: Ira Compton, 2434 Dayton Rd., Chico, Calif. 95928

[21] Appl. No.: 169,150

[22] Filed: Dec. 17, 1993

[51] Int. Cl.$^6$ .......................... A01D 46/26; B32B 1/06
[52] U.S. Cl. ............... 56/340.100; 56/328.1; 384/908
[58] Field of Search ............. 56/340.1, 328.1; 184/109; 384/12, 13, 16, 25, 42, 908

[56] References Cited

U.S. PATENT DOCUMENTS

| 3,318,629 | 5/1967 | Brandt, Jr. .................. 56/340.1 X |
| 3,335,556 | 8/1967 | Edgemond, Jr. ................ 56/340.1 |
| 4,521,468 | 6/1985 | Brandt ......................... 56/340.1 X |
| 4,757,674 | 7/1988 | Compton ...................... 56/340.1 |
| 4,893,458 | 1/1990 | Compton ...................... 56/340.1 |
| 4,921,073 | 5/1990 | Compton ...................... 184/11.2 |

FOREIGN PATENT DOCUMENTS 1329666  8/1987  U.S.S.R. ...................... 56/340.1

*Primary Examiner*—Stephen J. Novosad

[57] ABSTRACT

A friction reducing slip member for the shaker arms of a tree shaking harvester. The slip member in one form is a thin flexible panel structured for placement outward or over a main pad of the shaker head. The slip member includes a peripherally sealed interior chamber fully containing a friction reducing material such as grease, silicone lubricant, powdered or granular lubricants, or coatings having low coefficients of friction such as polytetrafluoroethylene. The lubricant allows the outer surface or side of the slip member to be positioned against a tree and to remain stationary during the tree shaking mode. The opposite interior side of the slip member is allowed to move with the shaker head as the shock waves are carried through the stationary surface of the slip member to the tree. The stationary side wall positioned against the tree protects the bark and cambium layer of the tree from damage. The fully contained lubricant helps allow the outer side wall of the slip member to remain stationary and also reduces friction and heat build-up to extend the life of the component parts of the shaker heads. The sealed compartment maintains the lubricant or lubricating agents free of wear and friction increasing debris falling from the tree or otherwise associated with the shaking of trees in an orchard.

2 Claims, 5 Drawing Sheets

SLIP MEMBER FOR THE HEAD OF A TREE SHAKING HARVESTER

BACKGROUND OF THE INVENTION

1. Field of the Invention

This invention relates to agricultural harvesting equipment in general, and more precisely to a self-contained friction reducing slip member provided for shaker heads of nut and fruit tree-shaker equipment.

2. Description of the Prior Art

In my earlier U.S. Pat. No. 4,921,073 entitled METHOD AND APPARATUS FOR LUBRICATING THE SHAKER HEADS OF A TREE SHAKING HARVESTER, issued May 1, 1990, I teach a method and structure of effectively lubricating the shaker heads of shaker type nut and fruit tree harvesting equipment. The shaker "head" is the padding or pad layer or pad layers affixed on the distal end of the shaker arm in order to cushion between the steel arm end and the tree. The primary object of the padding of conventional shaker heads is to prevent damage and injury to the trees when the two opposing shaker heads are clamped on either side of the tree and vibrated to dislodge the nuts or fruit. Each of the two shaker heads of the harvesting machine normally includes a large cylindrical resilient main pad which is attached to the distal ends of the metal shaker arms by a flat rectangular retaining sling, the sling generally comprised of a rubberized material which is wrapped over the pad and the ends of the sling affixed to the metal shaker arm with bolts or other suitable clamping or affixing arrangements. The main pad is made of thick and quite stiff rubbery material which is flexible, but the degree of flexibility is very low in that it is structured to compress and flex under the high clamping pressures of the opposing shakers arms. The shaker arms are most often arranged to clamp against a tree with the clamping pressure being applied by hydraulic rams on the shaker arms, and thus the clamping pressure is high per square inch. Normally a second flat rectangular member, the slip pad, is placed over the exterior of the sling and is structured to remain stationary against the tree when in use due to lubricant being placed between the sling and the slip pad. By remaining stationary against the tree, the slip pad protects the bark and cambium layer of the tree from being frictionally rubbed off, or in effect sanded off by the violent vibratory effect produced by the shaker heads, which could otherwise strip the bark and cambium layer and kill the tree. Placing lubrication between the slip pad and the retaining sling of the shaker head helps reduce friction and allows movement between the two, with the outer slip pad remaining stationary against the tree with the high clamping pressure of the opposing shaker arms. Shock waves are carried from the moving shaker arm and pad and sling through the stationary slip pad to impact the tree and thus cause shaking and vibration in the tree limbs sufficient to dislodge all of the nuts or fruit. The lubricant also increases the life span of the component parts of the shaker heads by reducing friction and thus heat, with heat being a major cause of the break-down of the padding of the shaker head.

The old method of lubricating the heads, prior to the introduction of my prior invention of U.S. Pat. No. 4,921,073, required manual application of the lubricant. This involved periodic stopping of the harvester to reapply the lubricant which entailed unhooking one end of the slip pad, raising it up away from the retaining sling, and placing the lubricant on the sling with a brush. This manual application of lubricant resulted in greatly increasing the harvesting time since the operator had to make a concerted effort to remember to apply the grease at the appropriate time which was normally several times an hour.

My prior invention taught in U.S. Pat. No. 4,921,073, includes a lubricant filled reservoir attached to a pressuring device which is used to deliver lubricant from the reservoir through a hose to the space between the padding and slip layers of the shaker heads. Because of the similar features of my previous invention to my present invention, my U.S. Pat. No. 4,921,073 is herein incorporated by reference.

While the method and apparatus for lubricating shaker heads as taught in my previously mentioned U.S. patent works well, the lubricant is not fully contained, but is disbursed and eventually lost out the ends and bottom of the shaker heads, which requires periodic replenishment of the lubricant. Compared to the present invention of this disclosure, this periodic reapplication of lubricant increases operating costs since extra lubricant must be purchased and extra time must be taken to refill the lubricant reservoir at the beginning or end of each operating day. An even more significant disadvantage of all related prior art involves the discharged or discarded lubricant. Today, there is an increasing awareness of potential environmental pollutants, and stricter regulations are being placed on agricultural practices. There is a perceived potential danger from the discarded lubricant accumulating in the soil to the point where some type of hazardous residue may show up in the harvested fruit, or that the lubricant may seep into underground water supplies or simply end up in streams and lakes with rain runoff. Therefore, there is a significant need to provide a fully contained lubrication system for the shaker heads of fruit tree harvesting equipment.

SUMMARY

With the present invention, I have provided a fully self-contained friction reducing slip member for attachment to a shaker arm of a tree shaking harvester. The friction reducing slip member effectively protects the trunk of the trees, and extends the life of component parts of the shaker head by reducing heat caused from friction. The term "friction reducing" or "friction reduction" is utilized in this disclosure, although complete friction elimination would be ideal since shock waves are carried through the shaker padding to impact the tree, and no frictional adhesion is require or desired between the material layer directly against the tree and the material layer against the backside thereof which receives the vibrations or shock waves (movement) from the shaker arm of the harvester.

The present slip member may be structured in various embodiments and may be used to replace or be incorporated into various known components of the shaker heads, i.e., the slip pad; the retaining sling; or the main pad itself.

Each embodiment in accordance with the present invention includes at least one layer of highly flexible material, or alternatively at least highly flexible peripheral seams connecting together at least a first and second material layer and defining a sealed lubricant containing compartment or chamber in order to prevent movement in the layer nearest the shaker arm from being carried through to the layer nearest the tree. The materials defining the slip member are properly impervious at least in the area of the sealed compartment to unwanted passage of material inward and outward of the compartment. It is desired that the layer nearest the tree or on the tree remain stationary, depending on the application of the present invention, or at least stationary to such a degree that any movement therein is non-injurious to the tree cambium layer during the shaking process. The opposite or juxtaposed layer of the slip member, that which is closest to the shaker arm will normally be moving with the vibratory movement of the shaker arm. Such movements in the end of the shaker arm and padding affixed thereto commonly range between two to four inches in a back and forth motion during the shaking process. Therefore with the present invention it can be appreciated that if one layer closest the tree remains stationary, and the opposing layer nearest the distal end of the arm moves back and forth, and that if the first and second layers are connected together with peripheral seams defining a lubricant carrying chamber, there must be a degree of flexibility in the structuring of the layers, seams defining the chamber, or both layers and seams. This flexibility may be gained by utilizing highly flexible materials to define one or more of the layers, or highly flexible seaming material at the peripheral seams defining the sealed chamber, or a combination thereof.

One embodiment of slip member in accordance with the present invention includes a thin rectangular flexible panel made of debris and liquid imperious rubbery material, and is referred to as a sling member, which houses an amount of long-life lubricant or other suitable friction reducing material permanently retained within an interior compartment of the sling member. The sling member is generally rectangular and flat when not attached to the shaker arm. The sling member is approximately the same size as the conventional retaining sling and performs the pad retaining function. The compartment extends horizontally to adjacent the terminal side ends of the member and can extend vertically to adjacent the top and bottom ends of the member, or extend to just above and below the area where the tree abuts the outer surface of the member. The prior art exterior slip pad could be eliminated altogether when this sling member in accordance with the present invention is used since the interior compartment essentially separates the slip member into two separate layers which are unattached or disconnected from one another in the center or inward of the peripheral seams defining the sealed compartment. The outer layer of material is positioned stationary against the tree in use, and the interior layer of material closest the shaker arm is compressed against the cylindrical pad on the shaker arm. The lubricant within the compartment allows movement between the two layers of flexible material of the slip member in the form of the sling member. Conceivably, if an exterior slip pad were to be used over the slip member serving as a retaining sling (sling member), it could also contain an interior sealed compartment housing a lubricant and thus would be essentially the same structure as the hereinabove described sling member, and this slip member in the from of a slip pad could be used in conjunction with the slip member serving as a retaining sling to further insure low friction and heat development, or it could just a be conventional solid slip pad serving to mechanically protect the present slip member serving as a retaining sling. It should be noted that a slip pad made in accordance with the present invention may be used over a conventional retaining sling which in turn is supporting a conventional main pad on the end of the shaker arm.

Another embodiment of the slip member in accordance with the present invention includes a layer, within the sealed chamber, of a thin flat flexible sheeting coated with a fixed material having a low coefficient of friction, such as polytetrafluorethylene (PTFE), commonly known under one trade name as "Teflon" from E.I. du Pont de Nemours & Co. The compartment may or may not contain an additional lubricant which works in conjunction PTFE coated surfaces. The fully sealed compartment could also be eliminated, with the two flat rectangular members of the resilient sling member being simply affixed together with the PTFE sheet or coating sandwiched therebetween, however, it is highly preferred for reasons of durability and thus economics to fully seal or contain any friction reducing material whether it is a liquid, powder or coated lubricating material in order to keep friction generating debris from working its way in between the layers being separated by the friction reducing material. Such debris will quickly destroy the lubricating qualities generally regardless of the type of friction reducing agent or material.

Another embodiment of the slip member in accordance with the present invention includes modification of the main pad itself, with the possible elimination of both the slip pad and retaining sling whether they are conventional or made in accordance with the present invention for economic purposes. The main pad could be affixed to the metal shaker arm directly using recessed bolts or other suitable non-obtrusive attachment arrangements through the normally open center thereof, with the outside surface facing the tree affixed with a layer of durable and highly flexible material or flexibly seamed material. The durable highly flexible material is preferably sealed to the relatively stiff pad at all peripheral edges to define a sealed compartment or environment in the center area thereof, with this area being placed to be the area which abuts the tree trunk during shaking. This sealed compartment must of course be sufficiently large to exclusively contact the tree during shaking if no other friction reducing member is positioned thereover. Within the sealed compartment would be a fully contained friction reducing material. The friction reducing material, as with any embodiment of the present invention, may be petroleum or synthetic based grease, oil, silicone lubricant, glass beads or other fine loose powders, or possibly a coating of PTFE or similar friction reducing material or coating to frictionally separate the main pad surface from the outer layer defining the compartment. In other words, the lubricant used with any of the above mentioned embodiments can include a wide range of materials or combinations thereof, such as oils, greases, or powdered agents. The lubricants can also include any non-fluid substance which suitably reduces or eliminates friction between the padded component members of the shaker heads, such as coatings or suspended sheets treated with PTFE or similar substances within the sealed compartment.

BEST MODE FOR CARRYING OUT THE INVENTION

Figure 1:
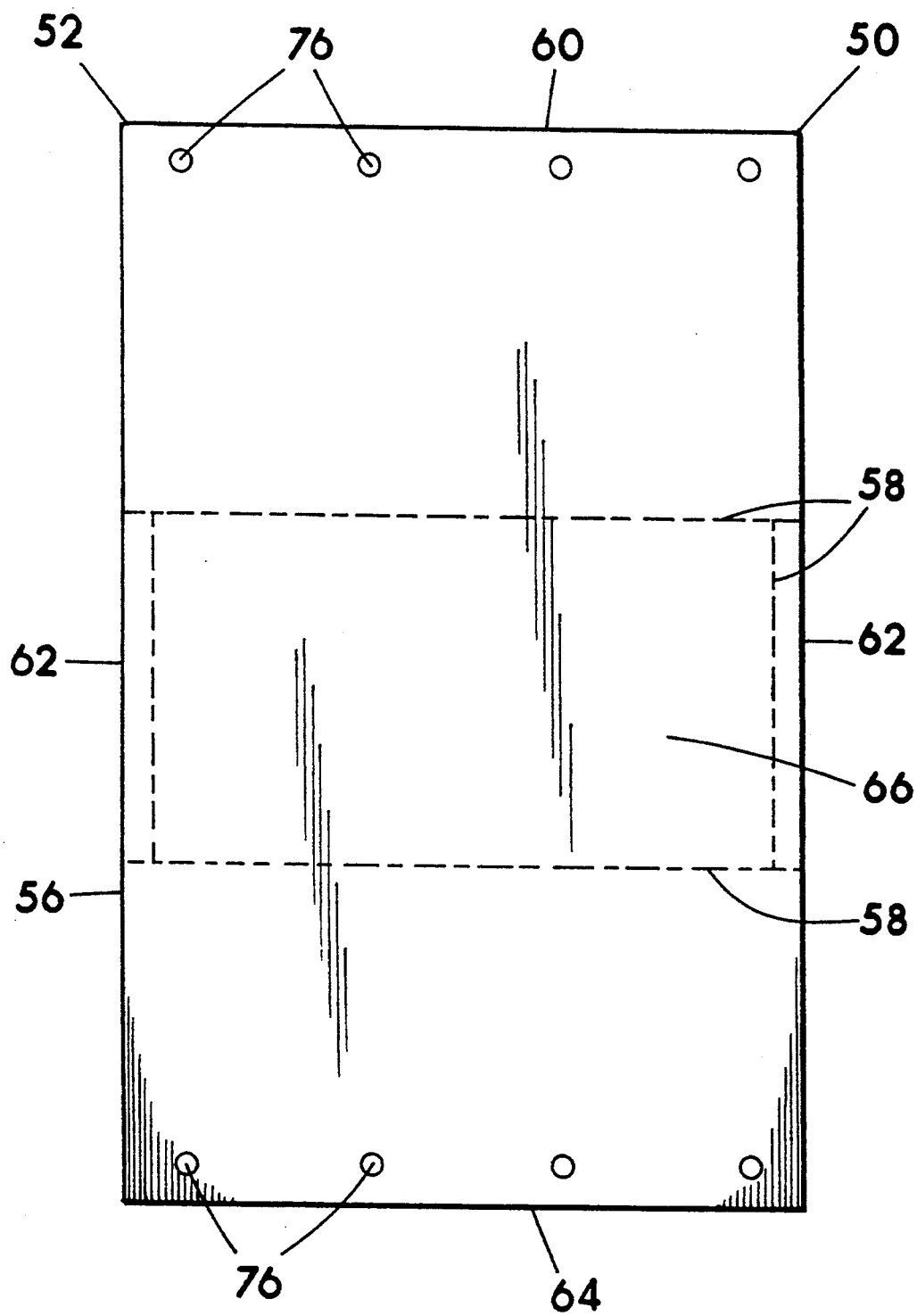
FIG. 1 is a top plan view of a slip member in accordance with the present invention and in a form which would be suitable for use as a pad retaining sling. The same structure could also be used in place of a conventional outer slip pad as those skilled in the art will recognize. The peripheral seams sealing and defining the interior chamber are illustrated by the dotted outlines.
Figure 2:
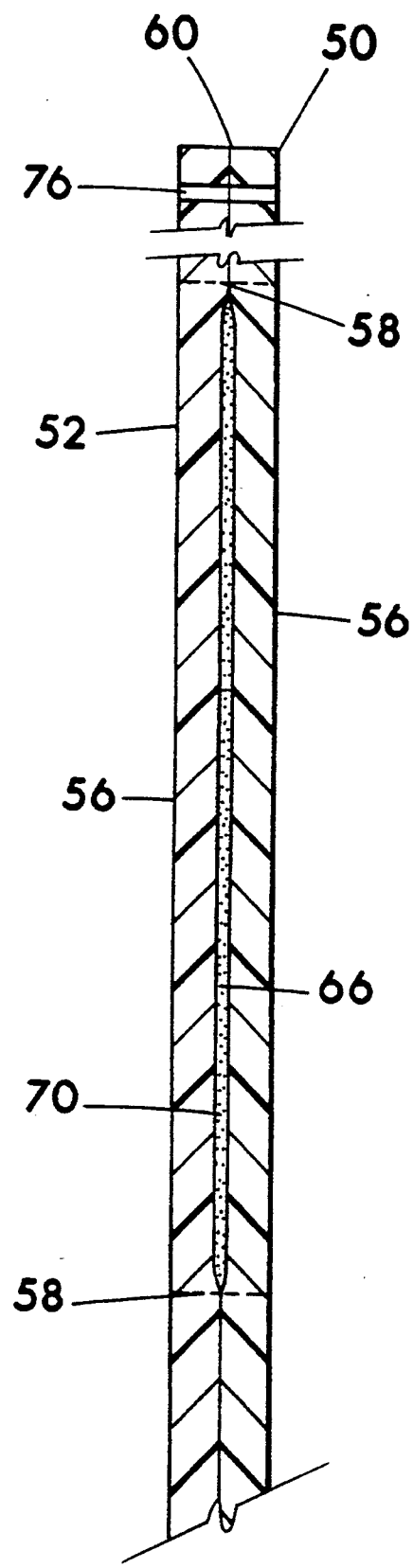
FIG. 2 is an enlarged cross-section of the upper portion of a flat panel embodiment of the slip member in accordance with the present invention showing the interior compartment containing a friction reducing material or lubricant. The interior surfaces of the compartment could additionally have a coating of friction reducing material such as PTFE to further insure the lowest possible coefficient of friction between the abutting surfaces.
Figure 5:
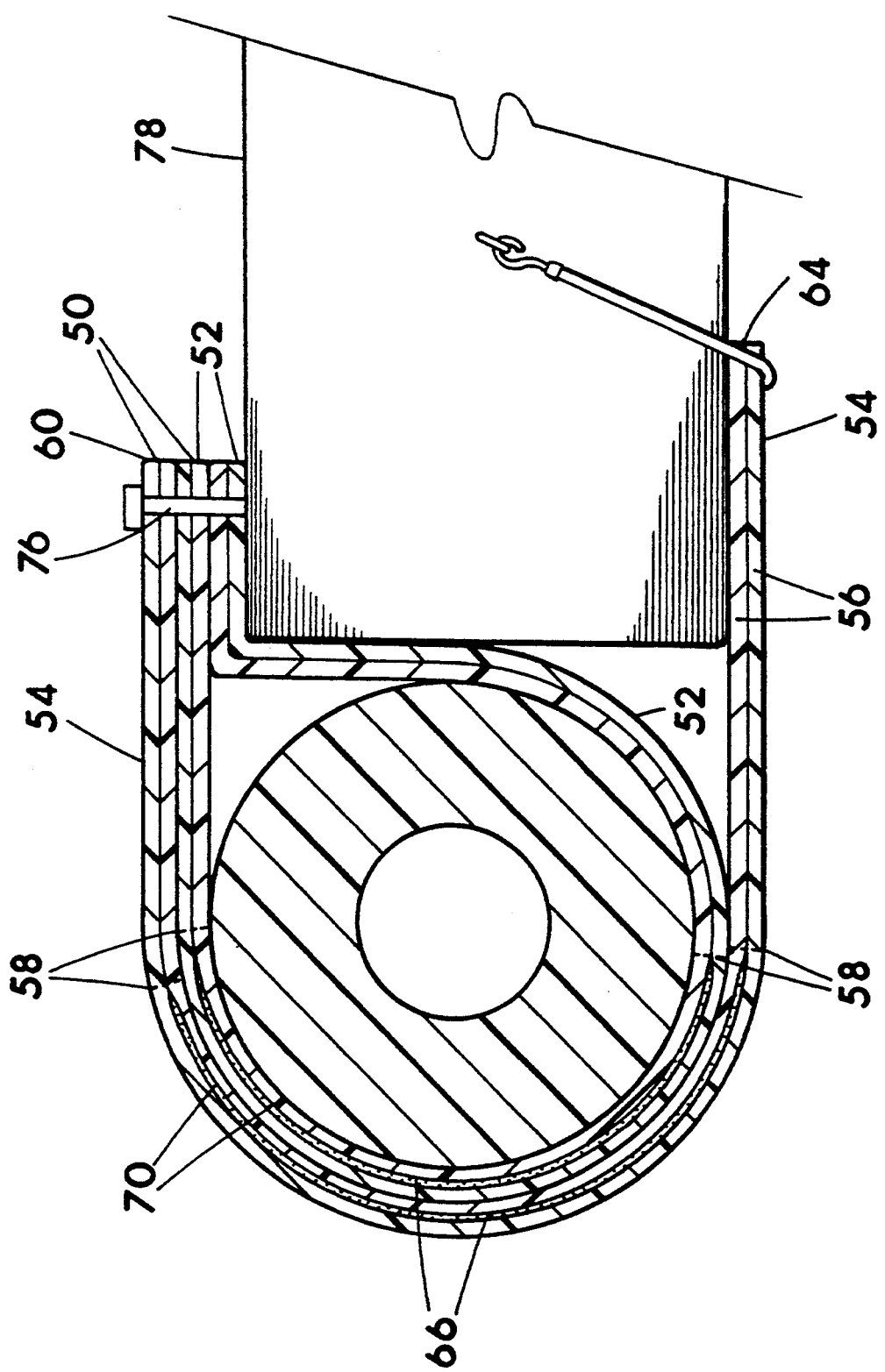
FIG. 5 is a cross-sectional side view of the distal end of a shaker arm showing a slip member in accordance with the present invention, in the form of an outer slip pad, and wrapped over a retaining sling which is also modified to include a sealed lubrication chamber in accordance with the present invention. The slip member in the form of the retaining sling is shown holding the main pad on the shaker arm.
Figure 6:
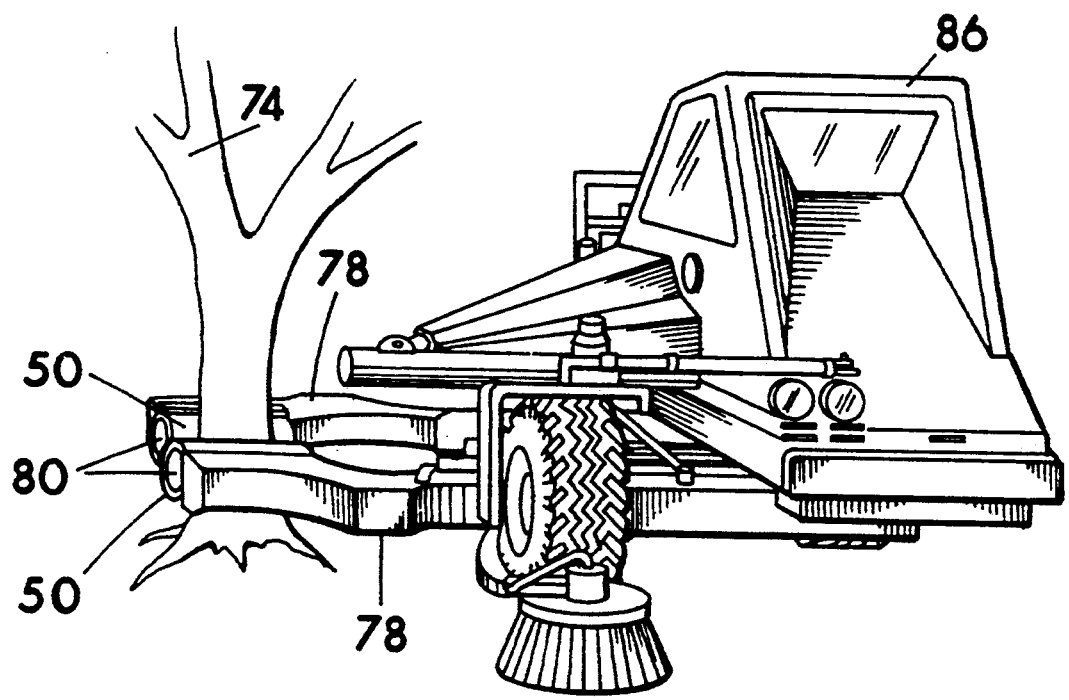
FIG. 6 illustrates slip members in accordance with the present invention in use affixed to the shaker heads on a tree shaking harvester preparing to harvest a tree.
Figure 7:
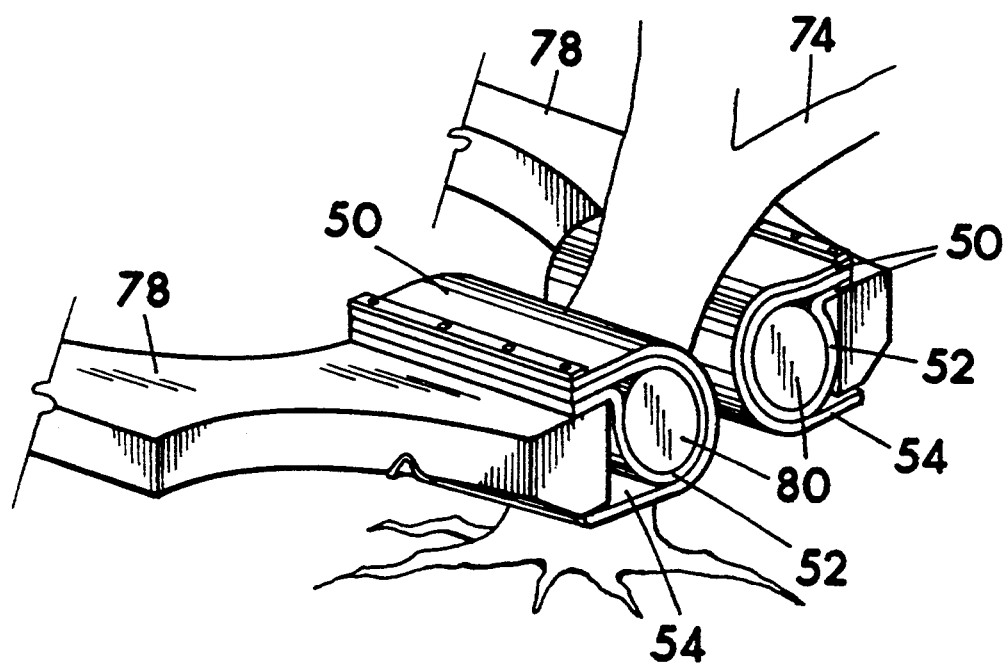
FIG. 7 illustrates slip members in accordance with the present invention supporting on shaker heads. The shaker arms are in the process of clamping against a tree.

Referring now to the drawings in general, and to FIG. 1 in particular where slip member 50 as hereinabove described as "sling member" is illustrated in the form of a flat rectangular panel member suitable for use as a pad retaining sling 52. The structure shown in FIG. 1 is essentially the same structure which would also be usable as a slip pad 54 also as hereinabove described if slightly more elongated, as slip member 50 can be structured into performing both functions as illustrated in FIG. 5.

One embodiment of slip member 50 is provided as pad retaining sling 52, and is comprised of two flat rectangular panels 56 of resilient rubbery material, which are affixed together to form the one pad retaining sling 52. The two panels 56 are affixed together by fluid impervious seams 58, which include a transverse top seam 58 located approximately one third the length down from the top edge 60 of pad retaining sling 52. Seams 58 can be highly flexible material, which may allow movement or flexing in the seam(s) itself in a range equal to the movement range of the shaker arm during shaking as hereinabove described. Such flexible seams may include fan-folded material un-attached in the center of the folds to provide length for a wide range of movement. Also included in FIG. 1 are two lengthwise side seams 58 adjacent the side edges 62 of sling 52, and a transverse bottom seam 58 located down about two thirds the length thereof. The significance of the location of seams 58 will be discussed later. The sealed seams 58 can be produced a number of ways including heat sealing, sewing, adhesives or combinations thereof. There is a normally closed or sealed interior chamber 66 created by seams 58, the front and back interior walls of which merely include the interior surfaces 68 of both panels 56. Chamber 66 can merely be structured similar to an envelope, having no discernable end or side walls. Minor expansion of the panels 56 of the chamber 66 can be created by pressurizing the chamber 66 with a lubricant 70.

Figure 3:
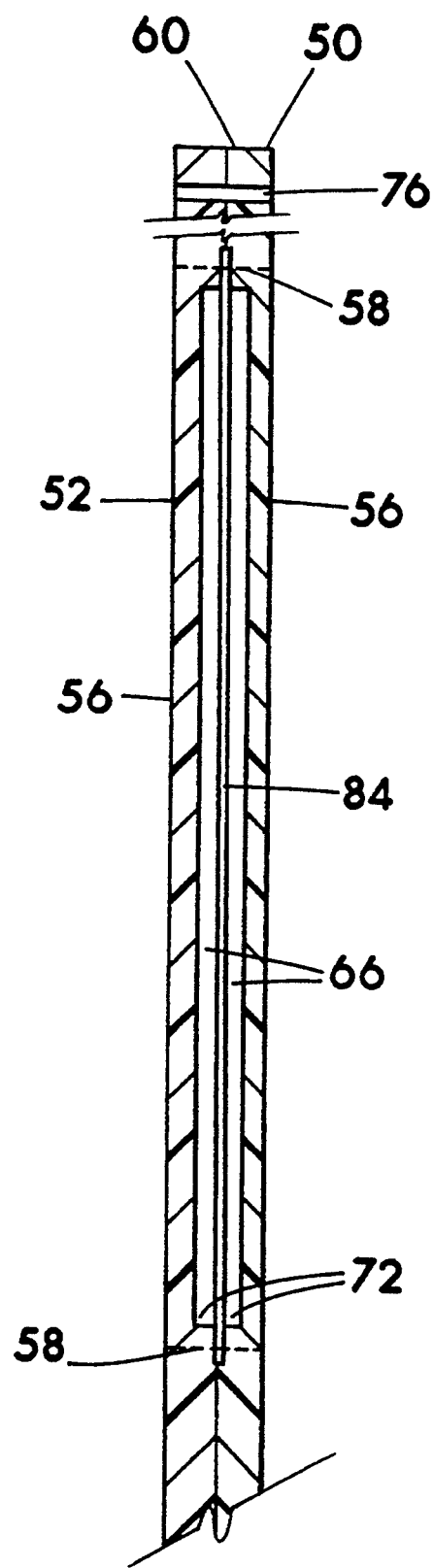
FIG. 3 is an enlarged cross-section of the upper portion of another flat panel embodiment of the slip member containing a central flexible layer of PTFE or "Teflon" or the like slick sheeting suspended between the inward facing compartment surfaces which could also have a coating of friction reducing material such as PTFE for example to further insure the lowest possible coefficient of friction between the surfaces. Grease or other suitable lubricants could also be loosely added between these layers within the compartment.
Figure 4:
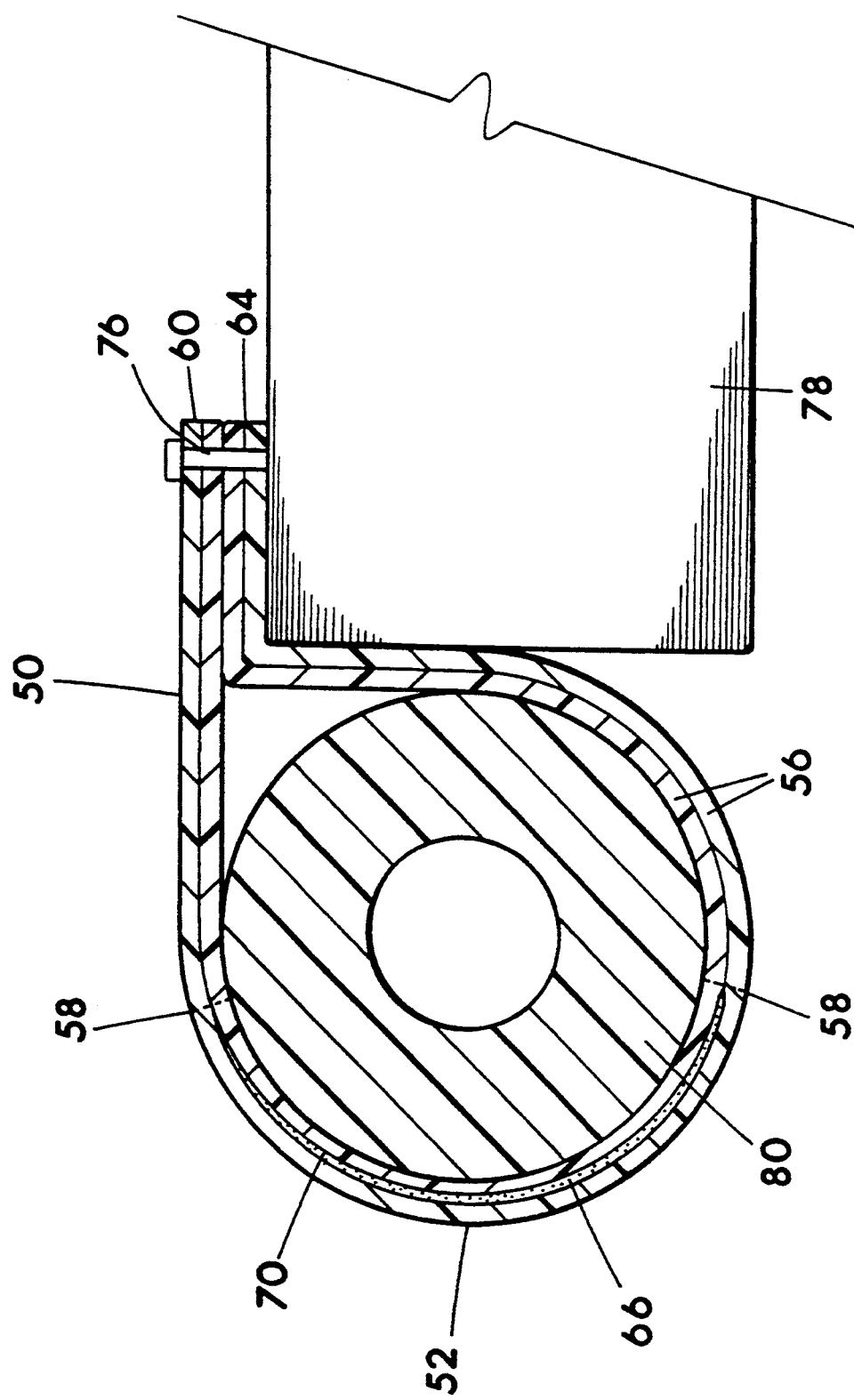
FIG. 4 is a cross-sectional side view of the distal end of a shaker arm showing a slip member in accordance with the present invention and in the form of a retaining sling supporting the main shaker pad.

The chamber 66 can also be enlarged by recesses 72 incorporated into the interior surfaces 68 of both panels 56 adjacent the chamber 66, as shown in FIG. 3. This larger chamber 66 may be desired for housing some types of bulky friction reducing materials, such as glass beads, or for larger amounts of fluid lubricants 70. Chamber 66 may contain a variety of lubricants 70, such as grease, oil, silicone lubricants and non-frictional fluid powdered agents such as graphite and the like, although other solid lubricating agents are also acceptable.

Although specific locations have been given for seams 58, and therefore indirectly also for the size of chamber 66, these dimensions are given as a preferred example. The chamber 66 could theoretically be sized almost as large as pad retaining sling 52 with only a marginal seam 58 created around the outer perimeter. This would however require lengthy seams 58 and also extra lubricant 70 would be required for the larger chamber 66. But since the major area on the slip members 50 which receives the most compression, friction and wear is a relatively small area, then chamber 66 containing the lubricant 70 may need only be located in this generally small area where the compression is likely to occur. This also helps prevent the lubricant 70 from pooling down in the lower end of the sling 52 where there is no compression or friction applied. The top edge 60 and bottom edge 64 of the pad retaining sling 52 (FIG. 1) contain several attachment apertures 76 for releasable connection to the top edge of the shaker arm 78, preferably with nuts and bolts. When in use, the pad retaining sling 52 is wrapped around the cylindrical pad 80 with the top edge 60 and bottom edge 64 drawn together with the attachment apertures 76 aligned. The aligned edges 60 and 64 of the pad retaining sling 52 are both then attached to the top edge of the shaker arm 78. The interior chamber 66 is now in a position where it will be aligned with and adjacent the tree 74 when in use. When both of the shaker arms 78 are affixed with a pad 80 and pad retaining sling 52 and are clamped to the tree 74, the compression exerted on the interior chamber 66 may force most fluid lubricant 70 upwards or downwards within the chamber 66. However, after the clamping pressure is removed, the pressure in the chamber 66 will equalize primarily due to the resilient nature of the rubbery pad 80 and pad retaining sling 52. Grooved or otherwise directive fluid lubricant channels may be incorporated into the interior of the sealed chamber 66 in order to direct a fluid lubricant during and after clamping in the desired directions within the chamber for the continuous proper reapplication of the lubricant within chamber 66. Chamber 66 will resume its original shape thus forcing lubricant back into the previous clamped area. The lubricant 70 will therefore be intermittently redistributed over the central interior surfaces 68 of the chamber 66 in this manner. This is another possible advantage in limiting the size of the chamber 66, since the larger the chamber 66 the more of a pooling effect in the lower end will be created by lubricant 70. Chamber 66 should not be so full of lubricant that the clamping pressure of the head against a tree causes rupturing of the chamber 66 like a balloon.

Due to the separation and lubrication of the two panels 56 of the pad retaining sling 52, the outer panel 56 which is abutted next to the tree 74 when in use will remain stationary, while the other panel 56 which abuts the pad 80 will vibrate with the rest of the shaker arm 78. The lubricant 70 allows free independent movement of the two panels 56 in the area of the chamber 66 and greatly reduces friction and heat which quickly deteriorates the pad retaining sling 52 and pad 80.

Another embodiment 82 of the pad retaining sling 52 includes the same basic structure of the two resilient panels 56, however there is a thin sheet coated with a material having a low coefficient of friction, such as PTFE, sandwiched between the two panels 56. This sheet is hereinafter referred to as PTFE panel 84. The recesses 72 in chamber 66 may or may not be included in this embodiment, and chamber 66 may or may not contain a fluid lubricant 70. The PTFE panel 84 functions in the same manner as the lubricant 70 to reduce friction and allow ample movement or slip between the two layers of the panels 56. PTFE panel 84 can also be substituted for a coating of the same basic PTFE substance on one or both interior surfaces 68 of the panels 56.

Although not shown in the drawings but hereinabove described in detail, another embodiment of slip member 50 can include modification of the main pad 80 itself to include chamber 66 with lubrication 70. This could be accomplished by affixing a small rectangular panel of rubberized flexible material over the area on the pad 80 which abuts the tree 74 when in use. This small panel would be sealed only around the edges with the interior area or chamber 66 left separated to house the lubricant 70 or a PTFE panel 84 or coatings. This modified pad 80 would contain a central bore for passage of bolts through the side wall to affix the pad 80 directly to the shaker arm 78. In this embodiment the use of both slip pad 54 and sling 52 could be eliminated.

Since all embodiments having lubricants 70 also have sealed chambers 66 which are self-contained, there is no leakage of potentially toxic pollutants to contaminate the soil or fruit being harvested. There is also no danger of the lubricant 70 being used up therefore eliminating potential danger to the tree 74. The operator of the harvesting machine 86 is also relieved of the duty of maintaining a full lubricant 70 reservoir, or from manually applying the lubricant 70. The harvesting machines 86 also remain cleaner and more presentable since the lubricant 70 is not continuously leaking out the shaker arms 78. Therefore, the present invention of the slip member 50 dramatically reduces harvesting time and therefore saves a significant amount of money while being more environmentally sound.

Having thus described and shown my invention by example in the specification and drawings adequately to allow those skilled in the art to both build and use my invention, it is realized various modifications in my invention by those skilled in the art will be possible. Therefore, I consider any changes or modifications made which fall within the scope and spirit of my appended claims to be my invention.

What I claim as my invention:

1. A generally rectangular panel sling member for retaining a generally cylindrical and resilient main shaker pad on an end of a vibratory shaker arm of a tree trunk shaking harvester, said sling member being sufficiently long and flexible for wrapping around the main shaker pad, said sling member including means for allowing removable attachment to the shaker arm with said sling member wrapped around the main shaker pad so that the attachment of said sling member to the shaker arm retains the main shaker pad on the shaker arm;

said sling member having a first layer and a second layer, said sling member including means for substantially preventing movement in said first layer of said sling member positioned nearest the main shaker pad from translating into tree injurious movement in said second layer of said sling member positioned outward of said first layer and nearer a tree during shaking; said means for substantially preventing movement in said first layer from translating into tree injurious movement in said second layer of said sling member including said first layer and said second layer of said sling member affixed to one another by means for defining a sealed chamber between the first and second layers, said sealed chamber being sufficiently sealed to prevent the entrance of foreign matter and dirt into said sealed chamber and into friction reducing material contained within said sealed chamber for providing low frictional adhesion between juxtaposed surfaces of said first and second layers within said sealed chamber; flexible means incorporated into said sling member for functioning in conjunction with the low frictional adhesion between said juxtaposed surfaces so that during vibratory movement of the shaker arm and said main shaker pad, movement within said first layer of said sling member against the moving main shaker pad is substantially prevented from translating into tree damaging movement in said second layer of said sling member, said flexible means providing a degree of flexibility allowing movement of said first layer independent of said second layer at least equal to movement range in the shaker arm vibratory movement of tree shaking, said sling member readily separable from the main shaker pad via said means for removable attachment for separate replacement of said sling member and the main shaker pad upon excessive wear from use during tree shaking.

2. A padding and friction reducing assembly on a vibratory shaker arm of a tree trunk shaking harvester, said assembly generally comprising;
(a) a generally cylindrical and resilient main shaker pad,
(b) a generally rectangular flexible panel sling member wrapped around said main shaker pad and removably attached to said shaker arm so as to retain said main shaker pad on said shaker arm;
said sling member having a first layer and a second layer, said sling member including means for substantially preventing movement in said first layer of said sling member positioned nearer the main shaker pad from translating into tree injurious movement in said second layer of said sling member positioned outward of said first layer and nearer a tree during shaking; said means for substantially preventing movement including said first layer and said second layer of said sling member affixed to one another by means defining a sealed chamber therebetween, said sealed chamber being sufficiently sealed to prevent the entrance of foreign matter and dirt into said sealed chamber and into friction reducing material contained within said sealed chamber for providing low frictional adhesion between juxtaposed surfaces of said first and second layers within said sealed chamber, flexible means incorporated into said sling member for functioning in conjunction with the low frictional adhesion between said juxtaposed surfaces so that during vibratory movement of the shaker arm and said main shaker pad, movement within said first layer of said sling member against the moving main shaker pad is substantially prevented from translating into tree damaging movement in said second layer of said sling member, said flexible means providing a degree of flexibility allowing movement of said first layer independent of said second layer at least equal to movement range in the shaker arm vibratory movement of tree shaking, (c) a flexible panel member removably affixed over said second layer of said sling member and serving to mechanically protect said sling member, said flexible panel member readily separable from said sling member for separate replacement of said flexible panel member and said sling member upon excessive wear from use during tree shaking.

* * * * *